L. MARTOCCI-PISCULLI.
GERMICIDAL THERMOMETER HOLDER.
APPLICATION FILED JAN. 28, 1916.
1,196,571.
Patented Aug. 29, 1916.
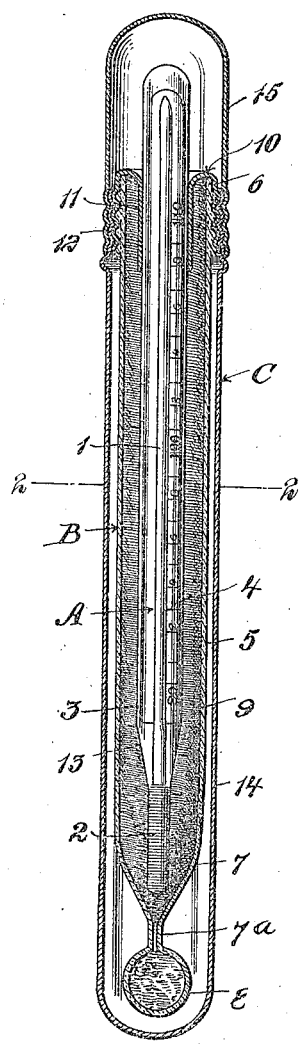
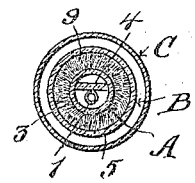
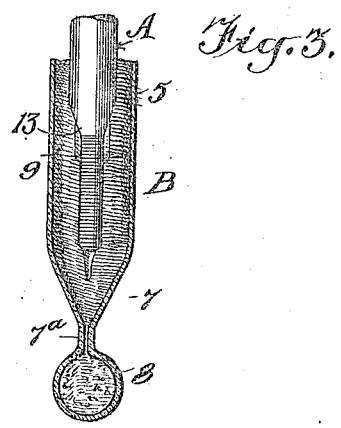
WITNESSES
INVENTOR
L. Martocci-Pisculli
BY
ATTORNEYS

UNITED STATES PATENT OFFICE.

LEON MARTOCCI-PISCULLI, OF NEW YORK, N. Y.

GERMICIDAL THERMOMETER-HOLDER.

1,196,571. Specification of Letters Patent. Patented Aug. 29, 1916.

Application filed January 28, 1916. Serial No. 74,769.

*To all whom it may concern:*

Be it known that I, LEON MARTOCCI-PISCULLI, a subject of the King of Italy, and a resident of the city of New York, borough of Manhattan, in the county and State of New York, have invented a new and Improved Germicidal Thermometer-Holder, of which the following is a full, clear, and exact description.

This invention relates to physicians' thermometers and deals more particularly with a germicidal holder in which the thermometer is normally held so as to be kept sanitary.

The invention has for its general objects to provide a simple, inexpensive and handy thermometer holder which enables the thermometer to be kept absolutely sanitary without using the unreliable methods commonly employed, the holder consisting of a tube of glass or other material which is lined with a tubular pad of wool or other porous material which is impregnated with a suitable powerful liquid germicide, the bore of the tubular pad being somewhat smaller than the diameter of the thermometer, so that when the latter is inserted, the liquid germicide is forced to the surface of the bore and thus in contact with the thermometer at all points, whereby a reliable germicidal effect is obtained.

A further object is the provision of a chamber at the closed end of the tube for containing a germicidal substance which slowly dissolves under the action of alcohol or equivalent liquid that is poured into the tube to saturate the pad, whereby the owner of the thermometer holder can keep the holder in a serviceable condition for a long time.

Another specific object is the provision of a cap-piece which is fitted to the open end of the tubular holder and has an inner portion lying within the tubular pad so as to form a guide for the easy insertion of the thermometer without wearing out the tubular pad or rendering it difficult to insert the thermometer, the outer portion of the cap being preferably, although not necessarily, threaded so as to screw into a metal or other protective casing or shell that is provided with a screw cap for protecting the protruding upper end of the thermometer.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical longitudinal section; Fig. 2 is a transverse section on the line 2—2, Fig. 1; and Fig. 3 is a fragmentary sectional view showing the thermometer partially inserted.

Referring to the drawing, A designates a pocket thermometer such as physicians use, B is a germicidal holder, and C is a protective casing or shell. The thermometer comprises a mercury tube 1 communicating with a bulb 2, and around the mercury tube is an outer protecting glass tube 3 that also contains a scale 4 behind the mercury tube 1.

The holder B consists of a tube 5 which may be of glass, as shown, and has an open upper end 6 and a tapered lower end 7 which terminates in a ball or spherical extremity 8. Within the tube 5 is a tubular pad 9 of wool or equivalent material which will absorb a liquid germicide. This pad extends to the bulb 8 in which latter is contained crystals of thymol or the like that slowly dissolves by the solution which impregnates the felt or wool 9. By reason of the tapered portion 7 the bulb 2 of the thermometer is arrested by the felt and it cannot enter the bulb 8. To facilitate the easy insertion of the thermometer into the holder B, a cap or mouthpiece 10 is applied to the upper end of the tube 5, this cap-piece having a cylindrical portion 11 which lies within the bore of the tubular pad 9, so as to constitute a mouth which flares at its outer end to thus facilitate the insertion of the thermometer. The outer portion 12 of the cap-piece 10 embraces the outside of the tube 5 and is preferably threaded. The tube 5 is slightly shorter than the thermometer so that the upper end thereof will project to enable it to be grasped in pulling the thermometer out. As shown in Fig. 3, the bore 13 of the tubular pad is somewhat smaller than the diameter of the thermometer, so that when the latter is inserted, the walls of the tubular pad are compressed, whereby the liquid germicide is forced into close contact with the surface of the thermometer, and furthermore, a mechanical cleaning action by the wiping engagement of the thermometer with the pad is obtained.

The holder B and thermometer are protected by the case C, which has a tubular body section 14 threaded at its upper end, so that the holder B can be screwed into it, and a cap section 15 which protects the protruding end of the thermometer screws externally on the body section 14.

As a germicidal solution, decolorized tincture of iodin may be employed, and from time to time a few drops of this may be poured into the holder B, or alcohol may serve the purpose.

The juncture between the bulb 8 and the lower conical end of the tube 5 is in the form of a capillary passage or neck $7^a$, whereby only a small part of the solution can enter the bulb and dissolve the crystals of thymol or other disinfectant material. The crystals are produced in the bulb by supplying a solution of thymol, which, upon being heated, is converted into crystals.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A pocket thermometer holder comprising a tube open at one end and having its opposite end contracted into a capillary neck, and a bulb connected with the neck to hold a germicidal substance, and a tubular porous lining in the tube extending from the open end to the said neck and adapted to be impregnated with the germicidal solution, said solution passing through the capillary neck as the lining compresses and expands during the insertion and removal of the thermometer.

2. A pocket thermometer holder comprising a tube open at one end and provided with a chamber at the opposite end and communicating with the tube through a capillary neck, and a tube of absorbent material in the first-mentioned tube and having a closed end terminating at the said neck, the bore of the last-mentioned tube being reduced at its closed end.

3. A pocket thermometer holder comprising a casing having an open end internally and externally threaded, a tube having an open end formed with an externally threaded cap to screw into the casing, and the cap having an inturned mouth portion forming a guide for facilitating the insertion of the thermometer in the tube, a lining of absorbent material in the tube and retained therein by the cap, and a cover cap screwed on the open end of the casing and adapted to cover the outer end of the thermometer.

4. A germicidal holder for a thermometer comprising a thermometer-receiving tubular holder open at its upper end and having a contracted lower portion terminating in a chamber for holding a germicidal substance, a tubular porous lining in the tube impregnated with a germicidal solution and having a bore normally smaller than the diameter of the thermometer, a cap-piece having a cylindrical mouth-forming portion extending into the bore of the lining and having a threaded cylindrical portion engaged with the outside of the tube, a casing having a threaded portion into which the cap-piece on the tube screws, and a cap screwed on the outside of the threaded portion of the casing and covering the upper end of the thermometer.

In testimony whereof I have signed my name to this specification in the presence of two subscribing witnesses.

LEON MARTOCCI-PISCULLI, M. D.

Witnesses:
 ROBERT TAUSIG,
 KARL TAUSIG.

Copies of this patent may be obtained for five cents each, by addressing the "Commissioner of Patents, Washington, D. C."